United States Patent [19]
Lee et al.

[11] Patent Number: 5,940,762
[45] Date of Patent: Aug. 17, 1999

[54] INTER-SYSTEM CALLING SUPPORTING INTER-SYSTEM SOFT HANDOFF

[76] Inventors: Kuo-Chun Lee, 17161 Alva Rd. #2013, San Diego, Calif. 92127; Gadi Karmi, 1220 Cave St. #3, La Jolla, Calif. 92037; Bibhu Mohanty, 11553 Windcrest La. #257, San Diego, Calif. 92128; Todd R. Sutton, 11275 Caminito Rodar, San Diego, Calif. 92126; Noam A. Ziv, 10968 Corte Playa Barcelona, San Diego, Calif. 92124

[21] Appl. No.: 08/649,959

[22] Filed: May 1, 1996

[51] Int. Cl.[6] .................................................. H04Q 7/22
[52] U.S. Cl. ........................... 455/442; 455/439; 370/331
[58] Field of Search ................................... 455/442, 437, 455/453, 436; 370/331

[56] References Cited

U.S. PATENT DOCUMENTS

| | | | |
|---|---|---|---|
| 4,670,899 | 6/1987 | Brody et al. .............................. | 455/436 |
| 5,267,261 | 11/1993 | Blakeney, II et al. ................... | 455/442 |
| 5,386,456 | 1/1995 | Schatz et al. ............................ | 455/436 |
| 5,434,854 | 7/1995 | Focarile et al. ......................... | 455/442 |
| 5,649,000 | 7/1997 | Lee et al. ................................. | 455/436 |
| 5,666,356 | 9/1997 | Fleming et al. ......................... | 455/453 |
| 5,697,055 | 12/1997 | Gilhousen et al. .................... | 455/33.2 |
| 5,722,074 | 2/1998 | Muszynski .............................. | 455/436 |

FOREIGN PATENT DOCUMENTS 9515665   6/1995   WIPO .............................. H04Q 7/24

OTHER PUBLICATIONS

Ian F. Akyildizt et al., "Performance Analysis of the Anchor Radio System Handover Method for Personal Access Communications System", *IEEE*, Mar. 24, 1996, pp. 1397–1404.

*Primary Examiner*—Edward F. Urban
*Attorney, Agent, or Firm*—Russell B. Miller; Brian S. Edmonston; Christopher Edwards

[57] ABSTRACT

A method and apparatus for performing an inter-system soft handoff is described. In accordance with the present invention, when a subscriber unit crosses from a first cellular system to a second cellular system, a base station controller determines if sufficient network resources are available to conduct a inter-system soft handoff. If so, the base station controller generates a set of signaling messages that cause call processing resource to be allocated and for the call to be processed at the second cellular system. The base station controller then perform data-selection and data-broadcast for the call by transmitting data to the subscriber unit by way of the second cellular system as well as via one or more base stations to which the base station controller is directly coupled. The determination as to whether sufficient network resources are available to conduct the inter-system soft handoff is based on the type of connection that exists between the first cellular system and the second cellular system, the number of inter-system calls being conducted, and the frame offset of the call currently being processed.

25 Claims, 11 Drawing Sheets

INTER-SYSTEM CALLING SUPPORTING INTER-SYSTEM SOFT HANDOFF

BACKGROUND OF THE INVENTION

I. Field of the Invention

The present invention relates to wireless telecommunications. More particularly, the present invention relates to a novel and improved method and apparatus for conducting telephone calls or other communications between wireless telecommunications systems that supports inter-system soft handoff.

II. Description of the Related Art

FIG. 1 is a diagram of a cellular telephone system configured in accordance with the use of code division multiple access (CDMA) radio frequency (RF) signal processing techniques. To conduct a telephone call or other communication, a subscriber unit 18 interfaces with one or more base stations 12 using CDMA modulated radio frequency signals over which both traffic and signaling data are exchanged. Each interface includes a forward link traffic channel transmitted within a forward link RF signal from the base station 12, and a reverse link traffic channel transmitted within a reverse link RF signal from the subscriber unit 18. Using the data exchanged, a subscriber unit 18 communicates with numerous other types of systems by way of base station controllers (BSC) 10 including public switched telephone network (PSTN) 19 and any systems coupled thereto. Typically, BSC's 10 are coupled to PSTN 19 and to base stations 12 via wire line links including, for example, T1 or E1 links, the use of which is well known in the art.

The IS-95 CDMA over the air interface standard (IS-95) promulgated by the Telecommunications Industry Association (TIA) is a set of standards for providing wireless telephone service via CDMA modulated RF signals. In accordance with the IS-95 standard, the forward and reverse link traffic channels are created by direct sequence modulating the data being transmitted with forward and reverse link traffic channel codes known to both the subscriber unit 18 and base station 12. Additionally, each base station 12 transmits a pilot channel via the periodic modulation of pilot data with a predetermined pilot channel code, with the offset associated with the pilot channel generated by each base station 12 being set to one of five hundred and twelve (512) time offsets to allow for identification of each base station 12. A subscriber unit 18 may detect the presence of the base station 12 by searching for the associated pilot channel. The use of channel codes for forming channels allows multiple communications to be conducted within a single RF bandwidth, and also allows adjacent base stations 12 to conduct communications using the same RF bandwidth. Both these characteristics allow for more efficient use of the available RF bandwidth, which is one of the advantages of CDMA technology.

The IS-95 standard also calls for data to be transmitted between base stations 12 and subscriber unit 18 in 20 milliseconds (ms) frames. To facilitate the even distribution of all the data being transmitted, the transmission time of each frame is set to one of sixteen frame offsets which occur some multiple of 1.25 ms after a frame edge. The frame offset is the amount of time the subscriber unit 18 delays transmission of a frame after a frame edge. The frame edge timing is provided to each subscriber unit 18 via synchronization information transmitted to each subscriber unit 18 using a synchronization channel transmitted within the forward link signal, and the frame offset for a particular communication is determined at the beginning of each communication which will remain the same throughout the call.

In accordance with the IS-95 standard, data is transmitted at one of four rates during each 20 ms frame, with the four rates being referred to as full rate, half rate, quarter rate and eighth rate. Cellular networks operating at full rates of either 9.6 kilo-bits per second or 14.4 kilo-bits per second are known, with the lower rates for each configuration being approximately equal to the next higher rate divided by a factor of two. The four data rates associated with a full rate of 9.6 kilo-bits per second are referred to as Rate Set One, and the four data rates associated with a full rate of 14.4 kilo-bits per second are referred to as Rate Set Two. To facilitate understanding of the exemplary embodiment of the invention described below, the number of bits transmitted at each frame rate for Rate Set One and Rate Set Two are shown in Tables I and II respectively, along with their associated probability of transmission during a typical voice conversation, however, no particular rate set is necessary to practice the invention, although the rate sets described are preferred because they comply with known standards.

TABLE I 9.6 Kbps Rate Set Frames

| Frame Type | Frame Length (Bits) | Probability |
|---|---|---|
| Full Rate | 256 | 0.291 |
| Half Rate | 160 | 0.029 |
| Fourth Rate | 120 | 0.072 |
| Eighth Rate | 96 | 0.598 |

TABLE II 14.4 Kbps Rate Set Frames

| Frame Type | Frame Length (Bits) | Probability |
|---|---|---|
| Full Rate | 352 | 0.291 |
| Half Rate | 208 | 0.029 |
| Fourth Rate | 136 | 0.072 |
| Eighth Rate | 104 | 0.598 |

Still referring to FIG. 1, sections of three CDMA cellular systems (which are also referred to as CDMA Cellular Land Networks—CCLN) are shown, each of which is comprised of a BSC 10 and the set of base stations 12 to which it is coupled. Each base station 12 interfaces with a set of the subscriber units 18 located within the corresponding coverage area 15. Most coverage areas 15 are divided into sectors 17 which correspond to separate antenna and RF signal processing systems within each base station 12 that are normally configured in a direction specific manner. Coverage area 15A is shown as a single sector 17 which generally corresponds to one or more omnidirectional antennas and RF signal processing systems. Billing, subscription and call routing functionality are typically provided within BSC's 10, or via the use of other systems coupled to BSC's 10 which are not shown. Separate CDMA cellular system's are generally used either by different service providers, or by the same service provider when the number of base stations 12 necessary to service an area exceeds the capacity of a single BSC 10.

As shown in FIG. 1 subscriber unit 18C is interfacing with a single base station 12 while subscriber unit 18A is interfacing with multiple base stations 12. The state of interfacing with multiple base stations 12 at the same time is referred to as soft handoff. Soft handoff can be contrasted with hard handoff during which a subscriber unit drops a first interface with a base station before establishing a second interface with another base station. Soft handoff increases the diversity of signal source for a corresponding subscriber unit since multiple connections are maintained at all times during the communication. Because of this increased diversity of signal source, soft handoff is typically considered superior to hard handoff. Hard handoff is nonetheless performed in most non-CDMA wireless cellular systems because each adjacent base station employs a different range of RF frequencies to conduct telephone calls, and most subscriber units can only operate at a single frequency band at any given time.

To perform soft handoff within a CDMA cellular system in accordance with the IS-95 standard, various functions must be performed by each BSC 10. These functions include selecting a best instance of reverse link data from a set of instances of reverse link data received (data-selection), as well as generating multiple instances of forward link data for transmission to the subscriber unit 18 (data-broadcasting). The multiple instances of the reverse link data are generated during a soft handoff by the set of base stations 12 with which the subscriber unit 18 has established an interface. Conversely, each instance of the forward link data generated is for transmission to transition of the same set of base stations 12. A description of the procedures associated with one method for performing a soft handoff is set forth in U.S. Pat. No. 5,267,261 entitled "MOBILE ASSISTED SOFT HANDOFF IN A CDMA CELLULAR COMMUNICATIONS SYSTEM" assigned to the assignee of the present invention and incorporated herein by reference. Additionally, each BSC 10 performs various power control operations necessary to the proper operation of a CDMA cellular telephone system as set forth in the IS-95 standard and a description of one implementation is provided in U.S. Pat. No. 5,056,109 entitled "METHED AND APPARATUS FOR CONTROLLING TRANSMISSION POWER IN A CDMA CELLULAR MOBILE TELEPHONE SYSTEM" assigned to the assignee of the present invention and incorporated herein by reference.

Another feature employed in CDMA cellular telephone systems is softer handoff. Softer handoff, is the state of simultaneously interfacing with two sectors 17 of the same base station 12, as is illustrated by subscriber unit 18B. In general, the multiple instances of the reverse link RF signal received from a subscriber unit 18B in softer handoff are combined within the associated base station 12, and the resulting single set of reverse link data is transmitted to the associated BSC 10. Similarly, any duplication of forward link data to be transmitted from each sector to the subscriber unit 18 in softer handoff is performed within the associated base station 12.

As shown in FIG. 1, subscriber unit 18C is located between the coverage areas 15 of two base stations 12 that are coupled to different BSC's 10, and therefore at the edge of two CDMA cellular systems. To provide complete mobility within a metropolitan region it is desirable to allow subscriber unit 18C to transitions into the second CDMA cellular system while continuing the call, as many metropolitan areas and other regions are large enough to require multiple CDMA cellular systems for complete coverage. While the BSC 10 processing the call could be switched as subscriber unit 18C moved from the first CDMA cellular system to the second CDMA cellular system, switching BSC's 10 would preclude the use of conventional soft handoff techniques as no single BSC 10 would have access to all the information generated by the first and second base station that would be necessary to perform data-selection and data-broadcast during the transition.

Without data-selection and data-broadcast, soft handoff cannot be performed in the normal manner. While a hard handoff similar to that performed in non-CDMA cellular telephone systems may be employed, during which the BSC 10 processing the call is switched, hard handoff is less desirable than soft handoff as noted above, and performing hard handoff within a CDMA cellular telephone system is especially difficult because use of same frequency in adjacent base stations creates interference not present in the non-CDMA systems. Therefore, a system and method for allowing a call to be processed across CDMA cellular systems that supports soft handoff across CDMA cellular system borders is highly desirable. The present invention is directed to such a system and method.

SUMMARY OF THE INVENTION

The present invention is a novel and improved method and apparatus for processing a wireless telephone call or other communication across CDMA cellular telephone systems that supports performing an inter-CDMA cellular system soft handoff. In accordance with the present invention, when a subscriber unit crosses from a first CDMA cellular system to a second CDMA cellular system, a base station controller determines if sufficient network resources are available to conduct an inter-system soft handoff. If so, the base station controller generates a set of signaling messages that cause call processing resource to be allocated and for the call to be processed at the second CDMA cellular system. The base station controller then perform data-selection and data-broadcast for the call by transmitting data to the subscriber unit by way of the second CDMA cellular system as well as via one or more base stations to which the base station controller is directly coupled. The determination as to whether sufficient network resources are available to conduct the inter-system soft handoff is based on the type of connection that exists between the first CDMA cellular system and the second CDMA cellular system, the number of inter-system calls being conducted, and the frame offset of the call currently being processed.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A method and apparatus for processing a wireless telephone call or other communication across CDMA cellular telephone systems that supports performing an inter-CDMA cellular system soft handoff is described. In the following description, the invention is set forth in the context of a radio frequency signal interface operating in accordance with physical signal modulation techniques of the IS-95 CDMA over-the-air protocol. While the described invention is especially suited for use with such signal modulation techniques, the use of other wireless telecommunications protocols is consistent with the practice of the present invention including protocols that utilize CDMA signal processing techniques or other protocols that are capable of providing soft handoff functionality. Furthermore, it should be understood that the present invention is intended for use with various types of communications, including both voice based communications as well as communications during which digital data representing information other than voice is transmitted.

Throughout the application the use and transmission of various types of information is described including data and signaling messages. It should be understood that this information is constituted by electronic representations of this data and signaling messages that are generated via the use of electric currents, voltage potentials, electromagnetic energy, or a combination thereof. Additionally, the following description contains reference to various systems for responding to, as well as manipulating and generating of, such information. In the preferred embodiment of the invention, such systems are implemented via the use of digital and analog integrated semiconductor circuits coupled to one another via various conductive connections or via the use of electromagnetic signals, or both. In other instances throughout the application, various well known systems are described in block form. This is done to avoid unnecessarily obscuring the disclosure of the present invention.

Figure 1:
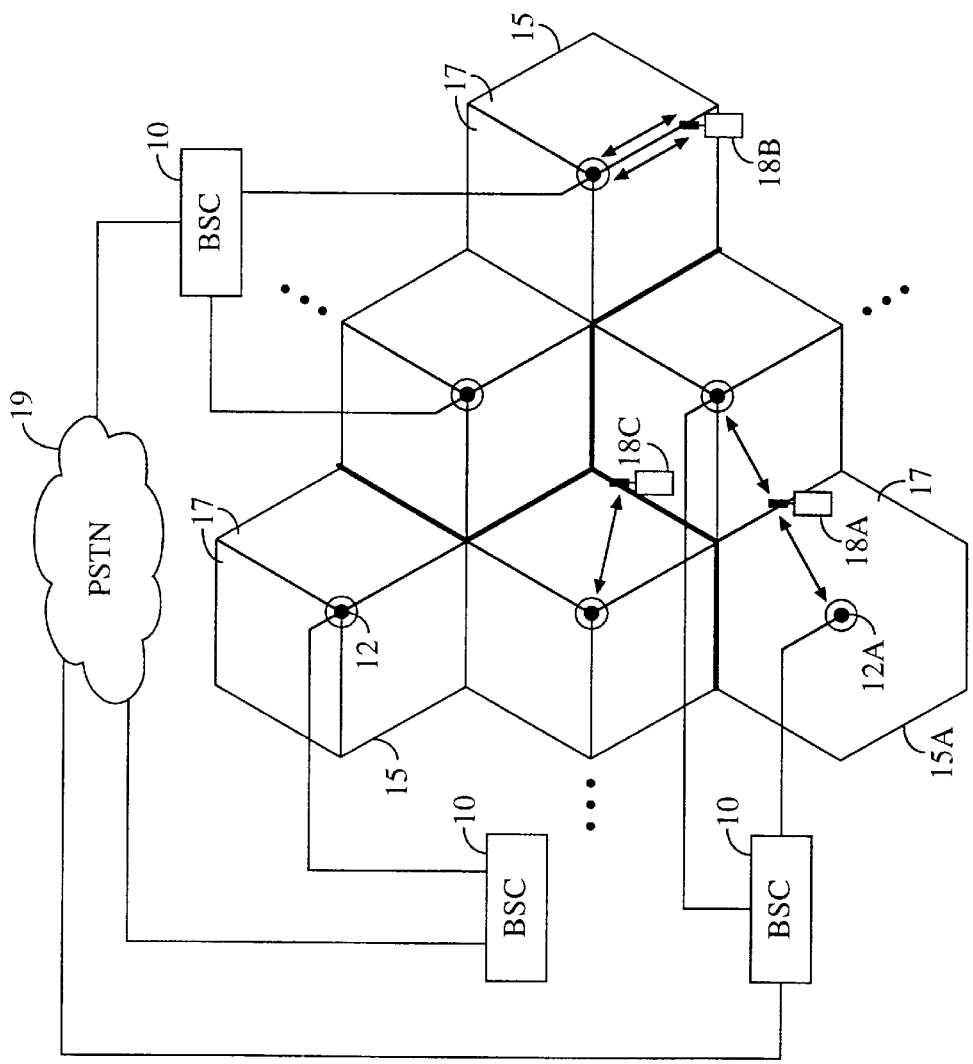
FIG. 1 is a diagram of a set of cellular systems configured in accordance with the prior art.
Figure 2A:
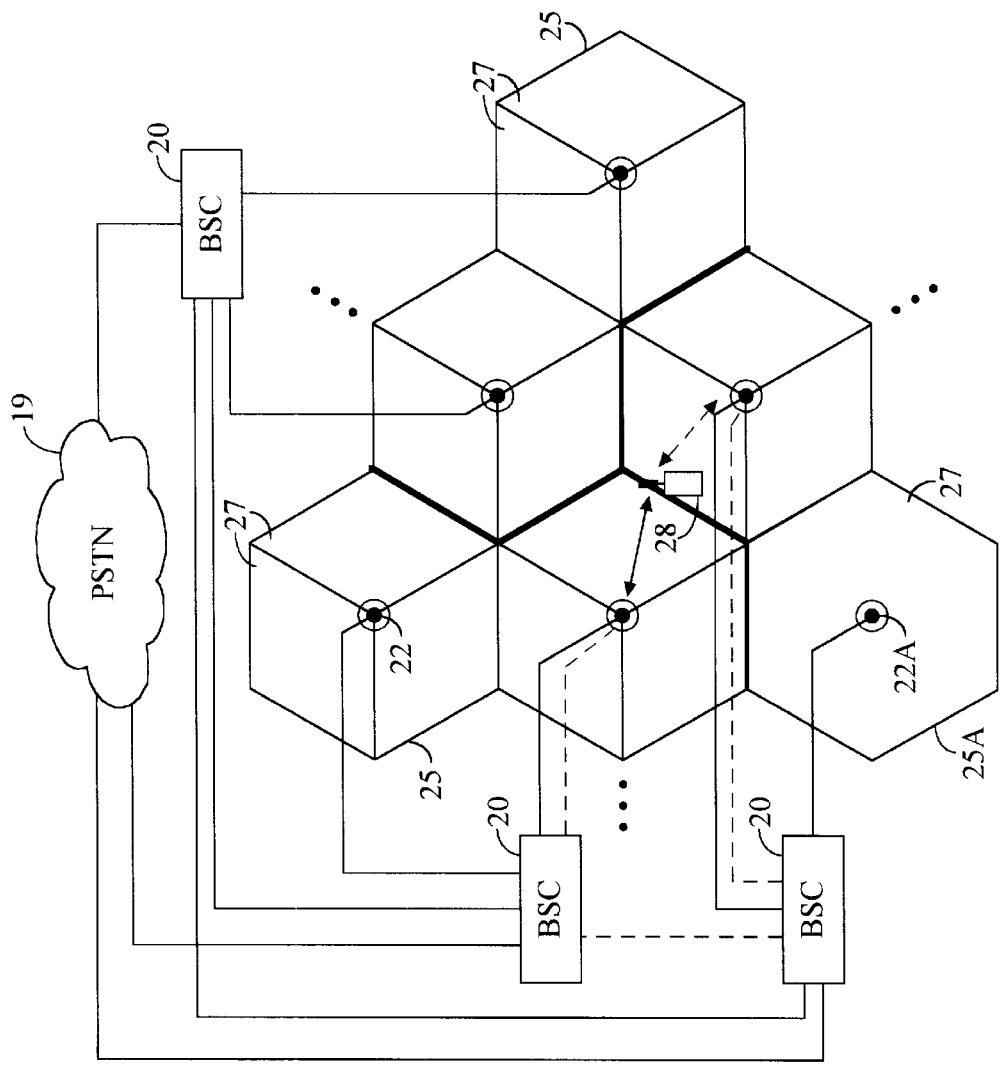
FIGS. 2A–D are diagrams of a set of cellular systems configured in accordance with one embodiment of the invention servicing a subscriber unit at various locations.
Figure 2B:
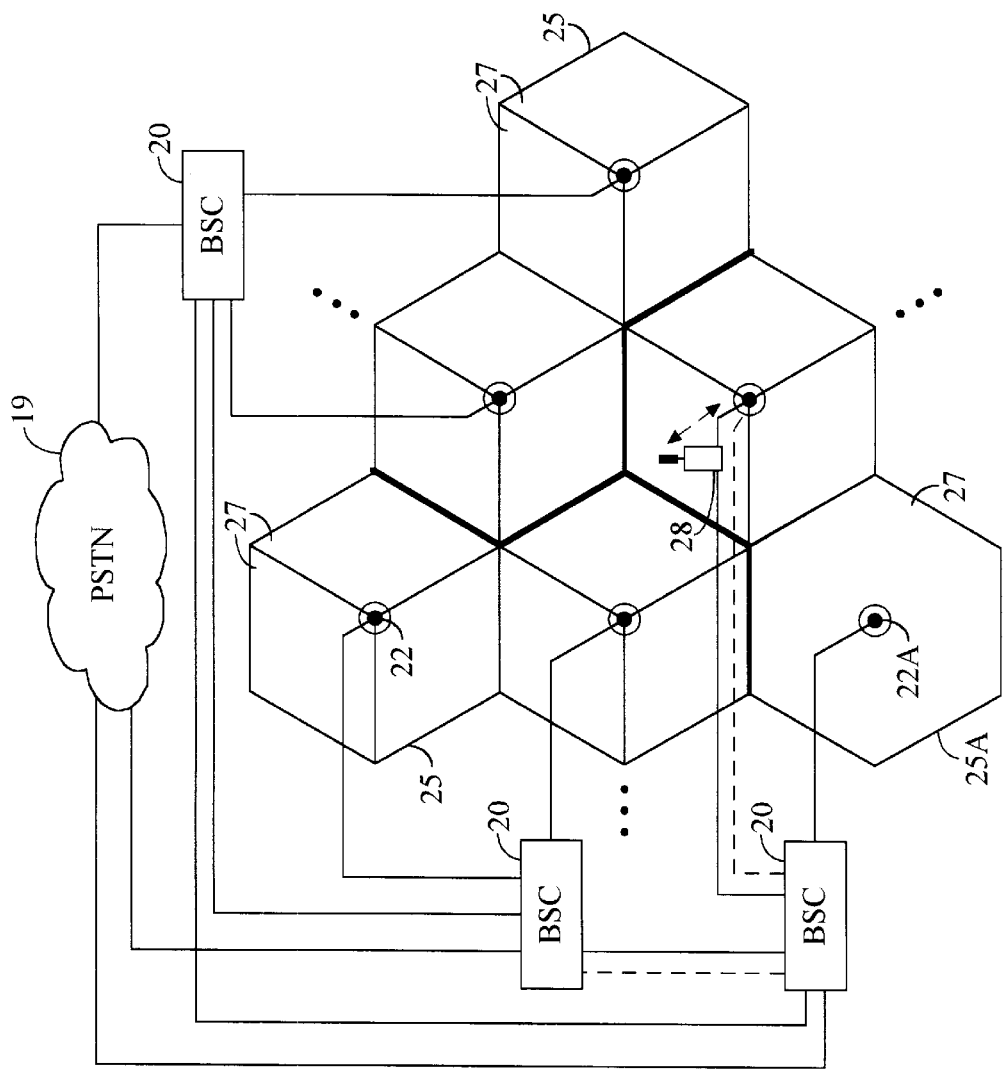

FIG. 2A is a block diagram of a cellular telephone system configured in accordance with one embodiment of the invention. Base stations 22 are coupled to base station controllers (BSC) 20. BSC's 20 are in turn coupled to public switched telephone network (PSTN) 19. Subscriber unit 28 is located within a coverage areas 25. As can be seen, the configuration of the cellular telephone system is similar to that shown in FIG. 1 except for the direct connections between the BSC's 20 shown. Using these direct connections, information will be exchanged between BSC's 20 that will allow an inter-system soft handoff to take place. In the preferred embodiment of the invention these connections are comprised of one or more T1 or E1 links configured to transmit data in frames. In one embodiment of the invention, frames are indicated via the use of leading and trailing flags in accordance with, for example, the HDLC protocol the use of which is well known in the art. Various other methods of providing a frame based interface will be apparent to one skilled in the art, and are consistent with the use of the present invention. While other embodiments of the invention may utilize other types of connections between BSC's 20, the invention is especially designed for use with a T1 or E1 connections because of their availability, stability and low cost. In fact, the ability to provide soft hand off capability between BSC's 20 coupled via the use of a T1 or E1 connections is one of the advantages of the present invention.

As noted above, a CDMA cellular system or "CDMA Cellular Land Network" (CCLN) is defined as a BSC 20 and the set of base stations 22 to which it is coupled. In FIG. 2, subscriber unit 28 is shown at the border of two CDMA cellular systems. The solid double arrow line indicates that subscriber unit 28 has established an RF interface with a first base station 22 and therefore with the associated CDMA cellular system. In the preferred embodiment of the invention the RF signals used to establish this interface are processed in accordance with CDMA techniques. For purposes of this application, the CDMA cellular system with which subscriber unit 28 is shown presently interfacing is the CDMA cellular system with which it first established a radio communication, and will be referred to as the anchor-CDMA cellular system. Additionally, any subsystem associated with the anchor-CDMA cellular system may be indicated as such via the use of the prefix "anchor-" and the system name, for example "anchor-BSC" and "anchor-base station". Similarly, any other CDMA cellular system involved in the inter-system soft handoff may be referred to as a target-CDMA cellular system, and any subsystem associated with a target-CDMA cellular system indicated as such via the use of the prefix "target-" and the system name, for example "target-BSC" and "target-base station".

In accordance with the present invention, as subscriber unit 28 moves to the target-CDMA cellular system located to the right and below the anchor-CDMA cellular system, the anchor-BSC 20 initiates an inter-system soft handoff by generating a set of signaling messages directed to the target-BSC 20 associated with of the first target-CDMA cellular system. These signaling messages are transmitted to the target-BSC 20 associated with the target-CDMA cellular system, and request information about the number of inter-system soft handoff calls currently being conducted by within that CDMA cellular system. The target-BSC 20 responds by transmitting a signaling message to the anchor-BSC 20 providing the requested information. In the preferred embodiment of the invention the requested information includes the total number of inter-system calls anchored at the first target-CDMA cellular system and having the anchor-CDMA cellular system as a target-CDMA cellular system, categorized by frame offset. That is, the number of calls that were originated by a subscriber unit within the target-CDMA cellular system, but for which that subscriber unit is presently in the anchor-CDMA cellular system. In the preferred embodiment of the invention, a BSC 20 stores this information internally within an inter-system call database, described in greater detail below. Using this information, as well as information maintained internally, the anchor-BSC 20 determines if sufficient network resources are available to conduct the inter-system call.

Figure 3:
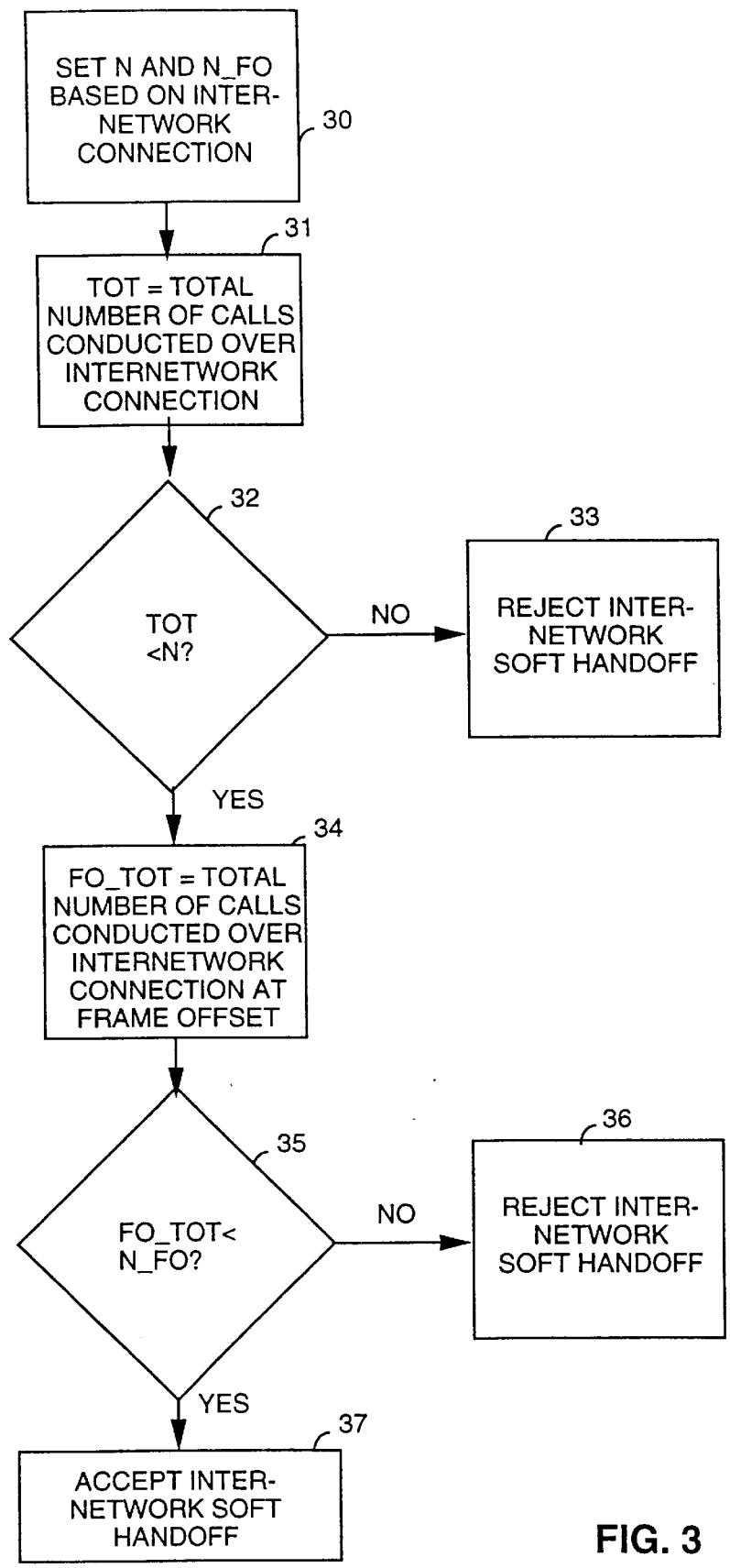
FIG. 3 is a flow chart illustrating the steps performed to determine whether sufficient interconnect resources are available to conduct an inter-system soft handoff.

The process associated with determining if sufficient network capacity exists to perform an inter-system call is illustrated by the flow chart shown in FIG. 3. At step 30, predetermined maximums N and N_FO are set based on the capacity of the connection between the anchor-BSC 20 and the target-BSC 20. At step 31 the anchor-BSC 20 determines the total number of inter-system calls being processed by way of the connection between the anchor-BSC 20 and the target-BSC 20 in both directions (TOT). That is, anchor-BSC 20 calculates the total number of inter-system calls either anchored at anchor-BSC 20 and targeted to target-BSC 20, or anchored at target-BSC 20 and targeted to anchor-BSC 20. At step 32 it is determined if this total number of calls is greater than or equal to a predetermined maximum N, and if so the inter-system call is rejected at step 33. Otherwise, the total number of inter-system calls being processed by way of the connection between the anchor-BSC 20 and the target-BSC 20 in either direction and associated with the frame offset (FO_TOT) of the call being processed is calculated at step 34. At step 35 it is determined if this total number is greater than a predetermined maximum N_FO, and if so the inter-system call is rejected at step 36. Otherwise the inter-system call is accepted at step 37. Values for N (Max. No. of Carried Calls) and N_FO (Max. No. of Call per Frame Offset) under various conditions are provided below.

Referring again to FIG. 2, if sufficient network resources are available anchor-BSC 20 generates a set of additional signaling messages that cause a call channel to be established between the anchor-CDMA cellular system and target-CDMA cellular system by way of the connection between the two CDMA cellular systems, and for establishing an inter-system soft handoff using this call channel to transition the subscriber unit into the first target-CDMA cellular system. The target-BSC 20 responds to the set of signaling messages by allocating call processing resources for routing data associated with the call, and by generating signaling messages that cause call processing resources to be allocated by the base station 22 providing the interface for the coverage area 25 into which subscriber unit 28 is entering. Using these call processing resources, the base station 22 in the first target-CDMA cellular system (target-base station 22) acquires and begins to process the reverse link channel generated by subscriber unit 28, and also transmits a forward link channel for detection and processing by subscriber unit 28 as indicated by the dashed double arrow line.

Anchor-BSC 20 continues to perform data-broadcast and data-selection for the call, with the dashed lines illustrating the path taken by the various instances of forward and reverse link data during the course of this data processing. For the forward link data, an additional instance is sent to the target-BSC 20 by way of the call channel established between the anchor and target BSC's 20. Using the internally allocated signal processing resources, target-BSC 20 forwards the data received from anchor-BSC 20 to the target-base station 22, which in turn transmits that data via the forward link channel allocated for to the call as shown. Forward link data continues to be transmitted to the subscriber unit 28 by way of the anchor-base station 22 originally interfacing with subscriber unit 28. The selection is performed by anchor-BSC 20 in similar fashion to that of intra-system soft handoff, except the selection is performed using reverse link data provided from both the original base station 22 and the base station 22 in the second CDMA cellular system provided by way of target-BSC 20. Thus, an inter-system soft handoff is established whereby subscriber unit 28 is engaged in bidirectional RF interfaces with two base stations 22 from different CDMA cellular system's, and data-selection and data-broadcast are performed within the anchor-BSC 20. Once the call has been established, anchor BSC 20 updates the inter-call database by incrementing the number of inter-system calls being conducted with the target-CDMA cellular system at the frame offset associate with the call being processed.

As subscriber unit 28 continues to move into the target-CDMA cellular system such that it leaves the coverage area 25 associated with the anchor-base station 22, the inter-system soft-handoff is terminated when the over the air link between the subscriber unit 28 and the anchor-CDMA cellular system is torn down, with the over the air portion of the inter-system call that remains being conducted completely within the target-CDMA cellular telephone system. The forward and reverse link data associated with the call continues to be routed through the anchor-BSC 20 and the target-BSC 20 via the call channel established, as shown by the dashed line in FIG. 2B. During the teardown procedure, the signal processing resource within the anchor-base station 22 processing the call are released for processing other calls.

Figure 2C:
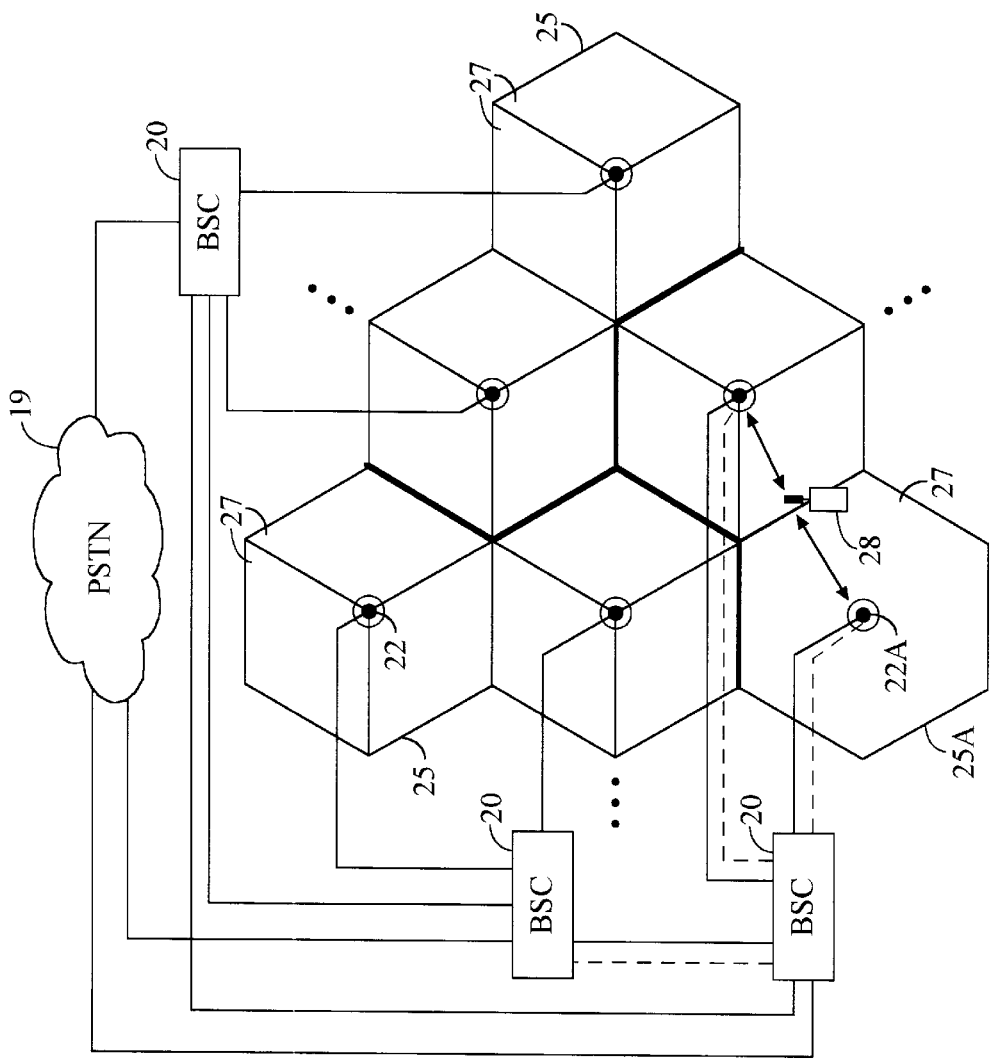
Figure 2D:
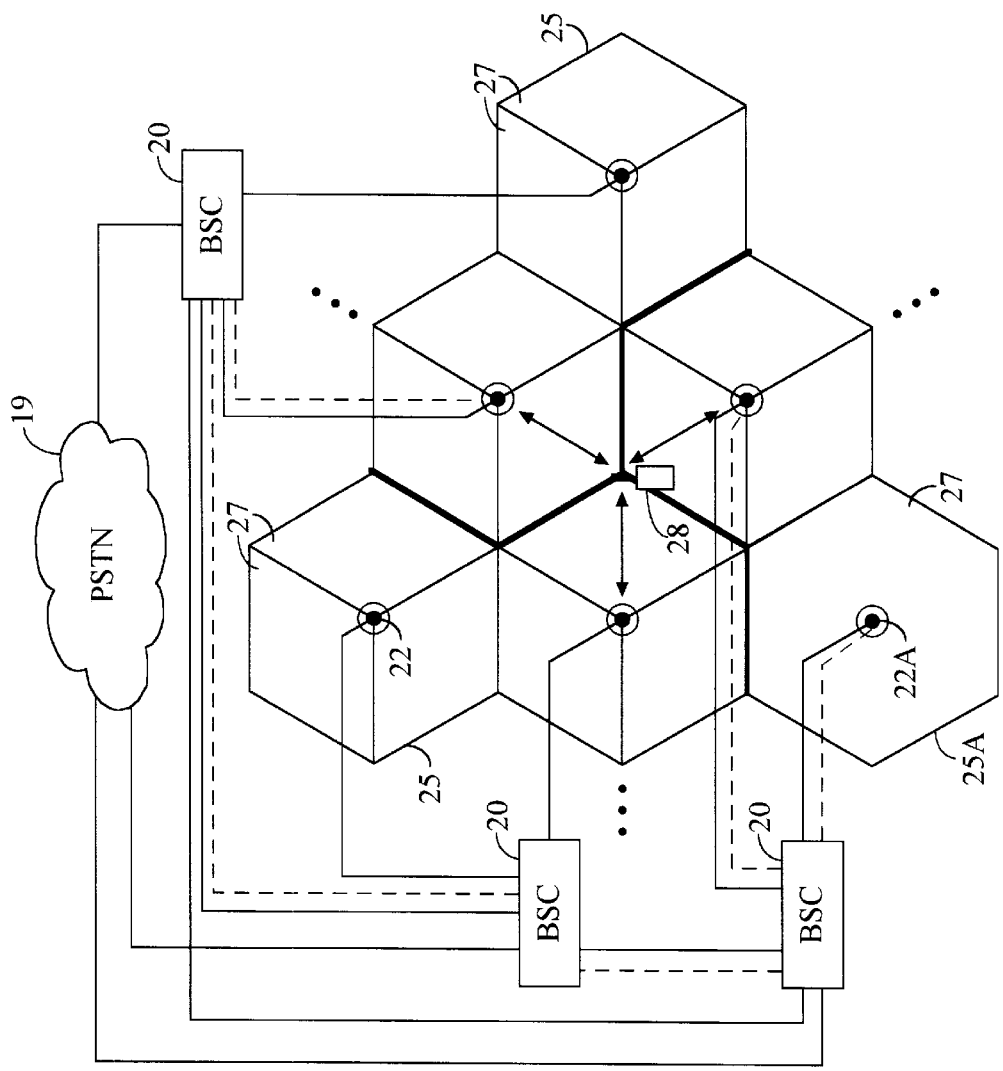

FIG. 2C shows the data paths used to process the forward and reverse link data as subscriber unit 28 enters the coverage area 25 of a second target-base station 22 that is part of the same CDMA cellular network as the first target-base station 22, which in this case is coverage area 25A. While subscriber unit 28 is located at the border of the two coverage area 25, and intra-system soft handoff is performed during which data-broadcast and data-selection are performed by anchor-BSC 20 with the forward and reverse link data traveling the paths shown by the dashed lines. Thus, the inter-system call continues to be performed, with an intra-system soft handoff being conducted within the target-CDMA cellular system using the anchor-BSC 20 to perform the call-broadcast and call-selection.

Referring again to FIG. 2A, if subscriber unit 28 alternatively proceeds into the third CDMA cellular system shown above and to the right of the anchor-CDMA cellular system, a second inter-CDMA cellular system soft handoff is established simultaneously with, and in similar fashion to, the first. That is, upon receiving indication from subscriber unit 28 that a pilot channel from a base station 22 associated with a third CDMA cellular system is being received above a predetermined threshold, the anchor-BSC 20 first determines if a network connection exists to the second target-CDMA cellular network, and if so, queries the associated BSC 20 as to the number of inter-system calls presently being conducted. Upon receipt of that information, anchor-BSC 20 then determines if sufficient network capacity exists to conduct the inter-system call, and if so generates a set of signaling messages that cause a second inter-system call channel to be established. Using a call channel created in the connection between the anchor-BSC 20 and the second target-BSC 20, forward and reverse link data is exchanged with base stations 22 in the third CDMA cellular system, with the data paths associated with such a "two-way" soft handoff shown in FIG. 2D. As can be seen from the dashed lines this second inter-system call is done while maintaining the first inter-system call, thus causing a inter-system soft handoff to occur involving three CDMA cellular systems. Once the second inter-system call is established, anchor-BSC 20 updates the inter-system call database by incrementing the number of inter-system calls being conducted with the second target-CDMA cellular system at the particular frame offset associated with the call.

As subscriber unit 28 continues to move into the second target-CDMA cellular system, and out of the coverage area associated with the first target-CDMA cellular system, the first inter-system call is terminated. Upon termination of the first inter-system call, anchor BSC 20 updates the inter-system call database by decrementing the number of inter-system call being conducted with the first target-CDMA cellular system at the particular frame offset associate with the call. If subscriber unit 28 continues to moves back into the coverage area of a base station 22 associated with the anchor-CDMA cellular system the second inter-system call is terminated. Upon termination of the second inter-system call, anchor-BSC 20 decrements the number of inter-system call being conducted with the second target-CDMA cellular system at the particular frame offset associate with the call. As can be seen, although the target-CDMA cellular system may change during a particular phone call or other communication, the anchor-CDMA cellular system remains the same.

In another embodiment of the invention an inter-system soft handoff between CDMA cellular systems having BSC's 20 that are not directly coupled to one another, but which are coupled by way of a third intermediate BSC 20, is contemplated. The use of such a technique is not preferred, however, because the delay introduced by the transport across three BSC's 20 degrades the performance of the associated telephone call by an unacceptable amount. In particular, it is known that a delay of substantially more than 100 milliseconds is noticeable to the subscriber during a telephone conversation. Given the extensive signal processing that is already necessary to perform a CDMA communication, insufficient additional time remains to allow routing through three of more BSC's 20 without noticeable delay. Furthermore, the control and configuration necessary to perform such an inter-system soft handoff is substantially greater than that associated with a dual BSC inter-system soft handoff. Thus, the preferred embodiment of the invention provides for the most efficient use of resources by not allowing an inter-system soft hand to take place if the only connection between the BSC's 20 of the target and anchor-CDMA cellular systems is by way of another intermediate BSC 20. Because of this, it is desirable to provide inter-system connections between as many pairs of BSC's 20 that a subscriber unit 28 may travel between as possible, especially pairs of BSC's 20 servicing the same region or market.

Figure 4:
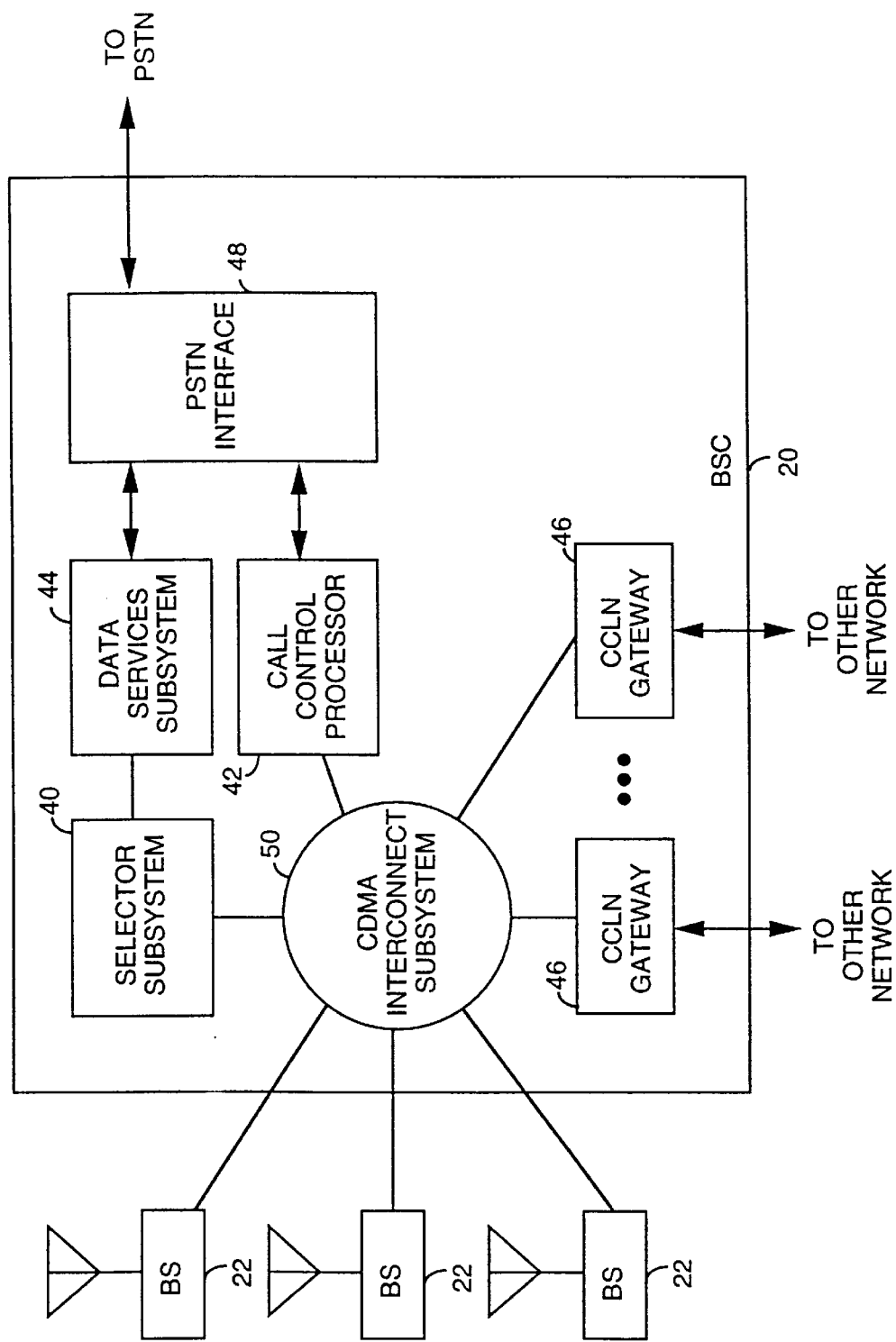
FIG. 4 is a block diagram of a base station controller configured in accordance with one embodiment of the invention.

FIG. 4 is an illustration of a base station controller 20 when configured in accordance with one embodiment of the invention and coupled to a set of base stations 22. Each base station 22 as well as selector subsystem 40 and call control processor (CCP) 42 are coupled to CDMA interconnect subsystem (CIS) 50. Additionally, CIS 50 is coupled to one or more CDMA cellular land network (CCLN) gateways 46 which in the preferred embodiment of the invention are coupled to other BSC's 20 as shown in FIG. 2. Data services subsystem 44 is coupled to selector subsystem 40 and to PSTN interface 48. CCP 42 is also coupled to PSTN interface 48. PSTN interface 48 provides switching functionality and in some embodiments of the invention provides billing and subscription information. In other embodiments of the invention PSTN interface 48 is located outside BSC 20, and billing or subscription information is provided by one or more additional systems that are not shown.

During operation, CIS 50 performs data frame (frame) routing using a twenty four bit address contained in each frame. In the preferred embodiment of the invention, a subset of the available twenty four bit address space is allocated to any particular BSC 20, which in turn assigns addresses from this subset to the set of internal systems and base stations 22 which it controls. To transmit a frame, a transmitting system places the address of the receiving system or resource within the frame. Additionally, in the preferred embodiment of the invention no overlap between the subsets of allocated addresses is allowed between two BSC's 20 that are coupled together. Forbidding overlapping address space between adjacent BSC's 20 in this manner reduces the possibility of frames being transmitted between the two systems in an infinite loop.

A frame can contain various types of data including traffic data and signaling data. Traffic data includes the voice and data information being transmitted by the subscriber, and signaling data includes the signaling messages exchanged by the various systems in order to properly orchestrate the processing of each call and the overall operation of the cellular network. A complete signaling message may be transmitted via the use of one or more frames. Data services subsystem 44 performs any necessary signal processing on the data received including vocoding or devocoding, converting to and from pulse code modulated (PCM) data format, or modulating and demodulated digital data to and from audio tones in accordance with standard FAX and digital modem signal processing. CCP 42 performs call set up and tear down by allocating and releasing the resources within BSC 20 including the selector resource within selection subsystem 40 and signal processing resources both within data services subsystem 44 and base stations 22. CCLN gateways 46 perform frame filtering using the address range or ranges associated with the CCLN for which they provide an interface.

For each telephone call or other communication processed by BSC 20 a selector resource (not shown) is allocated within selector subsystem 40 for performing data-broadcast and data-selection as described above. In order to perform the data-broadcast and data-selection, the selector resource maintains a list of the set of base stations 22 with which the subscriber unit 28 involved in the call is interfacing at any particular time and the CDMA cellular system with which that base station 22 is associated. In the preferred embodiment of the invention, this information is stored in the form of a base station ID, network address for each base station 22, and a BSC ID for each base station 22. Using the base station list, the selector resource duplicates and forwards data received from data services subsystem 44 to each base stations 22 involved in the call, and selects a single frame of data from the multiple frames received from the set of base stations 22 for forwarding to data service system 44. Additionally, selection subsystem 40 maintains a pilot database (PDB) which stores the pilot offset for each sector from each base station and the associated base station ID and network address, as well as information indicating the CDMA cellular system with which that base station 22 is associated. In the preferred embodiment of the invention this CDMA cellular system information is comprised of a BSC ID. As noted above, the number of unique pilot offsets for a system configured in accordance with the IS-95 standard is 512, thus in simple PDB only 512 sectors can be stored. Where it is necessary for the PDB to store more than 512 sectors, the base station and associated sectors are also correlated with the pilot offsets of the bordering base stations 22 in one embodiment of the invention, which can be used to compare with other base stations 22 having the same pilot offset so as to uniquely identify each base station 22 and any associated sectors.

CCP 42 maintains the inter-system call data database described above that tracks various parameters about the BSC 20 in which it is located and the associated CDMA cellular system. These parameters include each inter-system call being conducted via the BSC 20 and the associated frame offset of that call, as well as the set of BSC's 20 and associated CDMA cellular systems to which a direct connection exists for the BSC 20. Additionally, the inter-system call database stores the capacity of each direct connection to another CDMA cellular system which is based on the number of T1 or E1 links, or both, that make up the connection. The inter-system call database also stores the total number of inter-system calls anchored at the BSC 20 in which it is located. The total number of inter-system calls are subtotaled by the target-BSC 20 involved in the inter-system soft handoff, as well as the frame offset associated with the call, yielding a set of call totals c(i,n) where i is the target-BSC 20 index and n is the frame offset index.

In accordance with one embodiment of the invention, the systems shown exchange various types of information via the use of a set of signaling messages to properly process a telephone call or other communication. The set of signaling messages used to perform this exchange during various call processing procedures are shown in FIGS. 5–8. The vertical lines shown in FIGS. 5–8 are each associated with the system identified in the box at the top of each line. A horizontal arrow running between two vertical lines indicates the exchange of a signaling message between the associated systems. Time advances from top to bottom, so the higher up horizontal lines occur before those horizontal lines located lower down on the page. Where a single message is passed by way of a base station 22 two arrows are shown for the same message. Additionally, where only one anchor or target-base station 22 is shown, multiple base stations 22 may be substituted if intra-system soft handoff is taking place during the call processing procedure.

Figure 5:
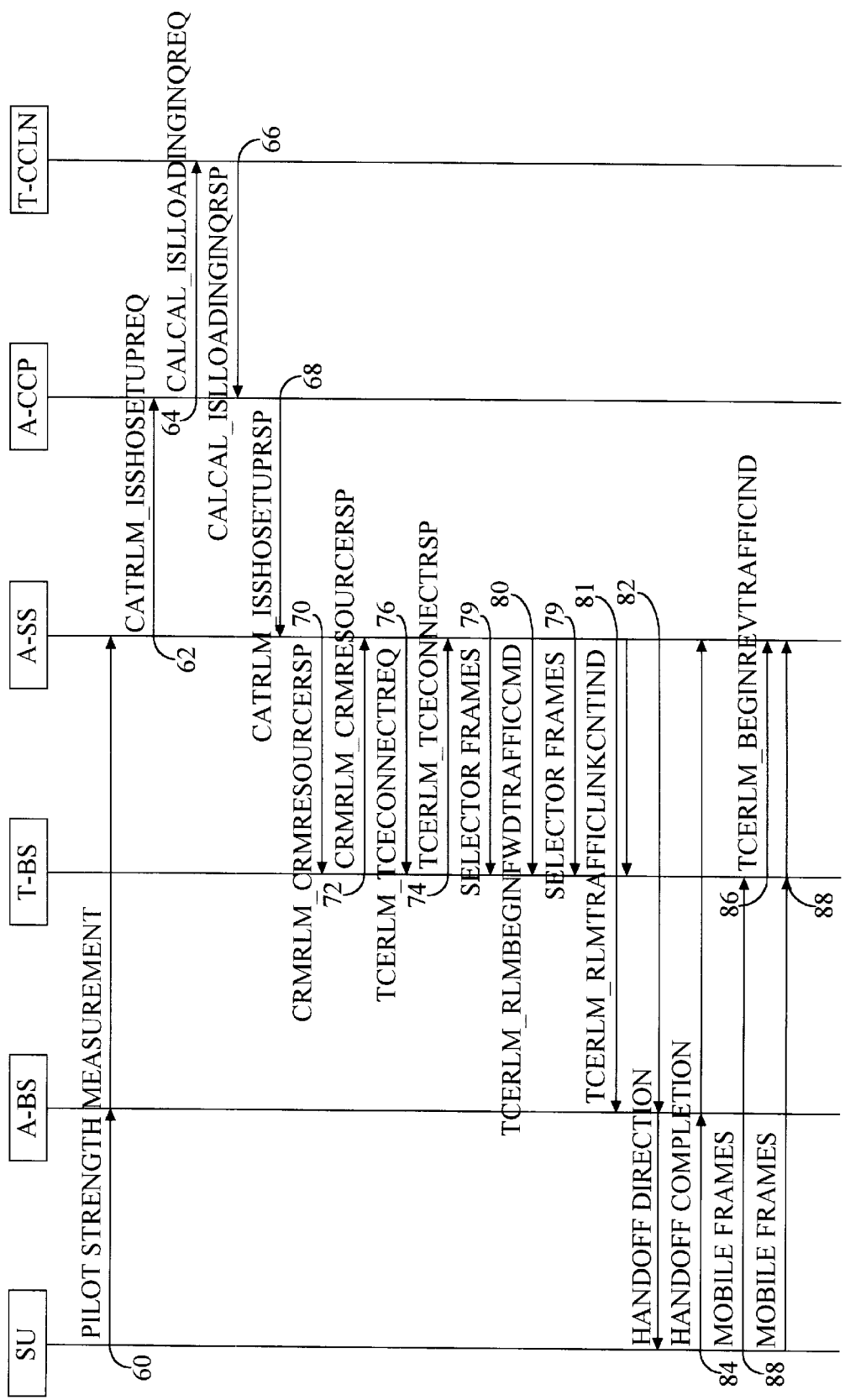
FIG. 5 is a message diagram illustrating the messages transmitted during an inter-system soft handoff setup procedure when performed in accordance with one embodiment of the invention.

The set of messages exchanged during an inter-system soft handoff setup is shown in FIG. 5. The inter-system soft handoff begins when subscriber unit (SU) 28 generates a Pilot Strength Measurement Report 60 indicating the signal strength of a pilot channel from a base station associated with a second CDMA cellular system is being received by the subscriber unit 28 above a predetermined level. In the preferred embodiment of the invention this information is provided in the form of a set of pilot strength measurements and the corresponding set of pilot offsets. Pilot Strength Measurement Report 60 is received by the selector resource (A-SS) within selection subsystems 40. Selection subsystem 40 first determines if a particular pilot channel has been received above a predetermined threshold for a predetermined period of time. If so, the selection subsystem 40 further determines if the pilot channel is from a base station associated with a CDMA cellular system with which no interface to the subscriber unit 18 has been established using the PDB. If so, selection subsystem 40 initiates an inter-system call and soft handoff with the base station 22 associated with that pilot channel by transmitting the BSC ID of the target BSC 20 to CCP 42 (A-CCP) via CATRLM_ISSHO Setup Request 62 along with the session ID identifying the call and the frame offset ID. The information contained in CATRLM_ISSHO Setup Request 62 is shown in Table III.

TABLE III

CATRLM_ISSHO Setup Request

| Parameter Name | Type | Description |
|---|---|---|
| Session ID | Mandatory | Sent in all message to CPP. |
| Target BSC ID | Mandatory | Identify the target CDMA cellular system for inter-system call and soft handoff. |
| Frame Offset ID | Mandatory | Identify the frame offset of the handoff call. |

CCP 42 responds by determining whether a direct connections exists to the BSC 20 associated with that CDMA cellular system by searching for an entry for that CDMA cellular system within the CDMA cellular system database. If no entry is found, the inter-system soft handoff request is rejected via a response signaling message transmitted back to the selector resource described below. Indication that no direct connection exists to the target CDMA cellular system is also provided by placing an entry for the target CDMA cellular system in the CDMA cellular system database with the capacity of the connection equal to zero.

If a direct connection does exists, CCP 42 further determines whether sufficient network resources exist to allow the inter-system call to take place. This determination begins by transmitting CALCAL_ISL Loading Inquiry Request 64 which queries the target-CDMA cellular system about the number of inter-system calls it is processing having the anchor-CDMA cellular system for the present call as the target-CDMA cellular system. The information contained in CALCAL_ISL Loading Inquiry Request 64 is shown in Table IV.

TABLE IV

CALCAL_ISL Loading Inquiry Request

| Parameter Name | Type | Description |
|---|---|---|
| Call ID | Mandatory | Sent for reference in CCP. |
| Anchor-BSC ID | Mandatory | Identify the anchor-CDMA cellular system and BSC of inter-system soft handoff. |
| Target BSC ID | Mandatory | Identify the target CDMA cellular system and BSC of inter-system soft handoff. |

The target-CDMA cellular system responds by transmitting CALCAL_ISL Loading Inquiry Response 66 to CCP 42. The information contained in CALCAL_ISL Loading Inquiry Response 66 is shown in Table V, and includes the number of inter-system calls for each frame offset for which the target-CDMA cellular system is an anchor-CDMA cellular system and for which the anchor-CDMA cellular system of the present call is the target-CDMA cellular system. That is, for an anchor-BSC 20 with a BSC ID equal to I the target-BSC 20 will return the vector c(I, 1 . . . 16) stored internally.

TABLE V

CALCAL_ISL Loading Inquiry Response

| Parameter Name | Type | Description |
|---|---|---|
| Call ID | Mandatory | Sent for reference in CCP. |
| Anchor-BSC ID | Mandatory | Identify the anchor-CDMA cellular system of inter-system handoff. |
| Target BSC ID | Mandatory | Identify the target CDMA cellular system of inter-system handoff. |
| Traffic Loading of Frame Offset #1 | Mandatory | Indicate the number of calls for frame offset #1 on the inter-system link between the anchor-BSC and the target CDMA cellular system, anchored at the target CDMA cellular system of inter-system handoffs. |
| . . . | . . . | . . . |
| Traffic Loading of Frame Offset #16 | Mandatory | Indicate the number of calls for frame offset #16 on the inter-system link between the anchor-BSC and the target CDMA cellular system, anchored at the target CDMA cellular system of inter-system handoff. |

While in the preferred embodiment of the invention, CALCAL_ISL Loading Inquiry Response 66 contains the number of inter-system calls being conducted for each time offset, other embodiments of the invention may transmit that information only for the frame offset of the call being processed as well as the total number of intersystem calls being conducted. In this case, CATRLM_ISSHO Setup Request 62 will also contain the frame offset of the call being processed. Also, in the preferred embodiment of the invention the target CDMA cellular system will track and store this information within the target-BSC 20 in an internally located CCP 42, although the target-BSC 20 need not be configured as the anchor-BSC 20. Using the data received in CALCAL_ISL Loading Inquiry Response 66 as well as the data stored internally as described above, CCP 42 calculates the total number of calls using the link between the anchor and target-CDMA cellular system in both direction, as well as the total number of calls using the frame offset of the call being processed in both directions. CCP 42 then compares these results with predetermined maximums that are set as a function of the rate set of the anchor-CDMA cellular system as well as the number of T1 or E1 connections used to link the anchor-and target CDMA cellular systems.

The maximums used in the preferred embodiment of the invention for rate sets one and two, as well as for various numbers T1 and E1 links are listed in Tables VI–IX. In calculating these values it is assumed that 35% of the inter-system calls will be in intra-system soft hand-off within the target CDMA cellular system, which each intra-system soft handoff generating additional cross network traffic. Table VI lists the maximum values for various numbers of T1 links at Rate Set One. Table VII lists the maximum values for various numbers of E1 links at Rate Set One. Table VIII lists the maximum values for various numbers of T1 links at Rate Set Two. Table IX lists the maximum values for various numbers of E1 links at Rate Set Two. Additionally, each table VI–IX lists the maximum values for 5% signaling traffic and 10% signaling traffic. Whether the 5% or 10% signaling traffic value should be used is determined by experimentation and will depend on the exact implementation and traffic patterns associated with each BSC 20. Each row also lists the inter-system Erlang capacity provided, a measurement well known in the art.

TABLE VI

T-1 Links for Rate Set One

| | 5% Signaling Overhead | | | 10% Signaling Overhead | | |
|---|---|---|---|---|---|---|
| Configuration | Max. No. of Carried Calls | Max. No. of Calls per Frame Offset | Erlang Capacity | Max. No. of Carried Calls | Max. No. of Calls per Frame Offset | Erlang Capacity |
| Single T-1 | 98 | 10 | 36 | 94 | 9 | 29 |
| Two T-1 | 218 | 23 | 153 | 208 | 22 | 143 |
| Three T-1 | 331 | 42 | 274 | 316 | 40 | 261 |
| Four T-1 | 444 | 62 | 379 | 423 | 59 | 359 |
| Five T-1 | 571 | 77 | 497 | 545 | 74 | 473 |
| Six T-1 | 687 | 97 | 607 | 656 | 92 | 577 |

TABLE VII

E-1 Links for Rate Set One

| | 5% Signaling Overhead | | | 10% Signaling Overhead | | |
|---|---|---|---|---|---|---|
| Configuration | Max. No. of Carried Calls | Max. No. of Calls per Frame Offset | Erlang Capacity | Max. No. of Carried Calls | Max. No. of Calls per Frame Offset | Erlang Capacity |
| Single E-1 | 154 | 12 | 51 | 148 | 11 | 44 |
| Two E-1 | 331 | 39 | 274 | 316 | 37 | 261 |
| Three E-1 | 497 | 65 | 428 | 474 | 62 | 407 |
| Four E-1 | 666 | 90 | 587 | 636 | 86 | 559 |

TABLE VIII

T-1 Links for Rate Set Two

| | 5% Signaling Overhead | | | 10% Signaling Overhead | | |
|---|---|---|---|---|---|---|
| Configuration | Max. No. of Carried Calls | Max. No. of Calls per Frame Offset | Erlang Capacity | Max. No. of Carried Calls | Max. No. of Calls per Frame Offset | Erlang Capacity |
| Single T-1 | 69 | 7 | 17 | 66 | 6 | 11 |
| Two T-1 | 172 | 18 | 103 | 164 | 17 | 94 |
| Three T-1 | 260 | 33 | 210 | 248 | 32 | 199 |
| Four T-1 | 352 | 50 | 294 | 336 | 48 | 279 |
| Five T-1 | 451 | 63 | 385 | 430 | 60 | 366 |
| Six T-1 | 542 | 76 | 470 | 518 | 72 | 448 |
| Seven T-1 | 641 | 88 | 557 | 612 | 84 | 536 |

TABLE IX

E-1 Links for Rate Set Two

| | 5% Signaling Overhead | | | 10% Signaling Overhead | | |
|---|---|---|---|---|---|---|
| Configuration | Max. No. of Carried Calls | Max. No. of Calls per Frame Offset | Erlang Capacity | Max. No. of Carried Calls | Max. No. of Calls per Frame Offset | Erlang Capacity |
| Single E-1 | 119 | 8 | 23 | 114 | 7 | 17 |
| Two E-1 | 260 | 22 | 143 | 248 | 21 | 133 |
| Three E-1 | 391 | 48 | 330 | 373 | 46 | 313 |
| Four E-1 | 528 | 70 | 457 | 504 | 67 | 435 |
| Five E-1 | 666 | 91 | 587 | 636 | 87 | 559 |

If the calculated call totals are greater than the corresponding maximum call totals in Tables VI–IX, CCP 42 denies the inter-system soft handoff in the response signaling message to the selector resource described below. In this case a hard handoff is substituted or the call is dropped. If the calculated call total are less than the corresponding maximum call totals in tables I–IV, CCP 42 initiates the inter-system soft handoff by transmitting CATRLM_ISSHO Setup Response 68. The information contained in CATRLM_ISSHO Setup Response 68 is set forth in Table X.

TABLE X

CATRLM_ISSHO Setup Response

| Parameter Name | Type | Description |
| --- | --- | --- |
| Call ID | Mandatory | Sent for verification purpose by Selector Subsystem. |
| ISHO Accept Status | Mandatory | Indicate if an inter-system handoff is accepted. |

Rejection or acceptance of the inter-system soft handoff is indicated with the ISHO Accept Status field. The selector resource responds to an acceptance by transmitting CRMRLM_CRM Resource Request 70 to the target base station 22. If the soft handoff is accepted, the target-base station 22 responds by assigning a traffic channel to the call. Once resources for processing the call are allocated, target-base station 22 transmits CRMRLM_CRM Resource Response 72 to the selector resource identifying the new traffic channel element and its address. The selector resource responds by transmitting TCERLM_TCE Connect Request 74 to the call processing resource within target base station 22 to establish the connection, and the call processing resource acknowledges receipt by transmitting TCERLM_TCE Connect Response 76. The selector resource then begins supplying forward link frames 79 associated with the call to the call processing resource, and indicates such by transmitting TCERLM_RLM Begin Forward Traffic Command 80.

The selector resource then transmits TCERLM_RLM Traffic Link Count Indicator 81 to the target base station 22 and each base station 22 within the anchor-CDMA cellular system to adjust the power control parameters. A method for performing power control that is used in conjunction with performing inter-system soft handoff is described in co-pending U.S. patent application filed on Mar. 13, 1996 Ser. No. 08/614,652 entitled "METHOD AND APPARATUS FOR PROVIDING CENTRALIZED POWER CONTROL ADMINISTRATION FOR A SET OF BASE STATIONS" also assigned to the assignee of the present invention and incorporated herein by reference, as well as in the above described power control patents. Additionally, the selector resource transmits handoff direction 82 to the subscriber unit 28 which contains the forward link traffic channel being utilized by target base station 22 to process the call. Subscriber unit 28 responds by processing the forward link channel from the target base station 22, and once the channel is processed successfully by transmitting handoff completion 84 to the base stations 22 in the anchor-CDMA cellular system. The target base station 22 also begins searching for the reverse link signal from subscriber unit 28 and upon successful detection transmits TCERLM_RLM Begin Reverse Link Traffic Indication 86 to the selector resource along with reverse link frames (mobile frames) 88. The selector resource then begins selection using the reverse link frames from the target base station 22. At this point the intersystem soft handoff has been established, and CCP 42 updates the CDMA cellular system database to indicate an additional inter-system call is being conducting with target-BSC 20 using the frame offset associated with the call.

As intra-sysetm soft handoffs occur within the target-CDMA cellular system as subscriber unit 28 moves in the coverage area of other base stations 22, a set of signaling messages similar to that shown in FIG. 5 are exchanged except for messages 62–68. Messages 62–68 are not exchanged because it is not necessary to determine whether additional network capacity exists, as this was already accounted for in the calculation of maximum number of carried calls and maximum number of calls per frame offset values used during the setup of the inter-system call and inter-system soft handoff.

Figure 6:
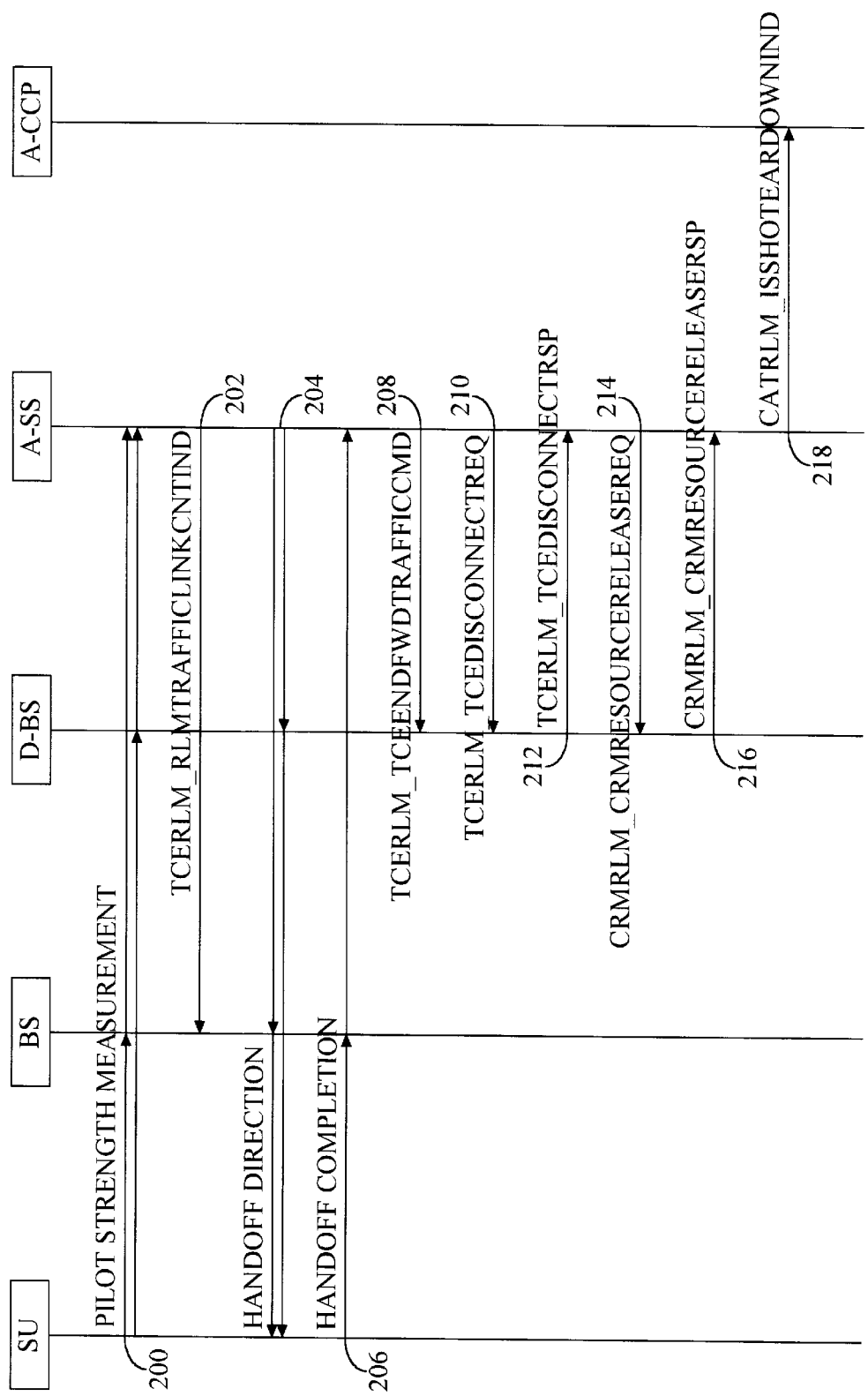
FIG. 6 is a message diagram illustrating the messages transmitted during an inter-system soft handoff teardown procedure when performed in accordance with one embodiment of the invention.

FIG. 6 is a timing diagram illustrating the signaling messages exchanged during the course of a soft handoff teardown when performed in accordance with one embodiment of the invention. The teardown begins when subscriber unit 28 transmits a pilot strength measurement report 200 indicating the pilot channel from a base station 22 is being received below a predetermined level to selection subsystem 40. The selector resource within selection subsystem 40 responds by transmitting TCERLM_RLM Traffic Link Count Indication Command 202 to the set of base stations 22 that will remain involved with the call to adjust the power control parameters. Selection subsystem further transmits Handoff Direction 204 to subscriber unit 28 via each base station 22 indicating the handoff with the base station 22 in the target-CDMA cellular system should be terminated. Subscriber unit 28 responds by transmitting handoff completion 206 to the selector resource, which in turn transmits TCERLM_TCE End Forward Traffic Command 208 and TCERLM_TCE Disconnect Request 210 to the base station 22 being dropped (D-BS). The dropped base station 22 responds by terminating the transmission of forward link traffic frames to the subscriber unit 28 and by transmitting TCERLM_TCE Disconnect Response 212 to the selector resource, which in turn responds by transmitting CRMRLM_CRM Resource Release request 214 to the dropped base station 22. After releasing the resources associated with processing the call, the dropped base station 22 transmits CRMRLM_CRM Resource Release Response 216 to the selector resource. If selection subsystem 40 also determines that the CDMA cellular system associated with the dropped base station 22 has no other interface with the subscriber unit 18 it notifies CCP 42 the inter-system call has been terminated by transmitting CATRLM_ISSHO Teardown Indication 218. The information contained in CATRLM_ISSHO Teardown Indication 218 is set forth in Table XI.

TABLE XI

CATRLM_ISSHOT Teardown Indication

| Parameter Name | Type | Description |
| --- | --- | --- |
| Session ID | Mandatory | Sent in all message to CCP. |
| Target BSC ID | Mandatory | Identify the target CDMA cellular system with which all air interfaces have been terminated. |
| Frame Offset ID | Mandatory | Identify the frame offset of the inter-system soft handoff call. |

In the preferred embodiment of the invention, the determination that the CDMA cellular system associated with the dropped base station 22 has no other interface with the subscriber unit 28 is performed by selection subsystem 40 using the base station list. Upon receipt of CATRLM_ISSHO Teardown Indication 218 CCP 42 decreases the total number of inter-system calls between the anchor-CDMA cellular system and target-CDMA cellular system anchored at the anchor-CDMA cellular system and having the associated frame offset.

Figure 7:
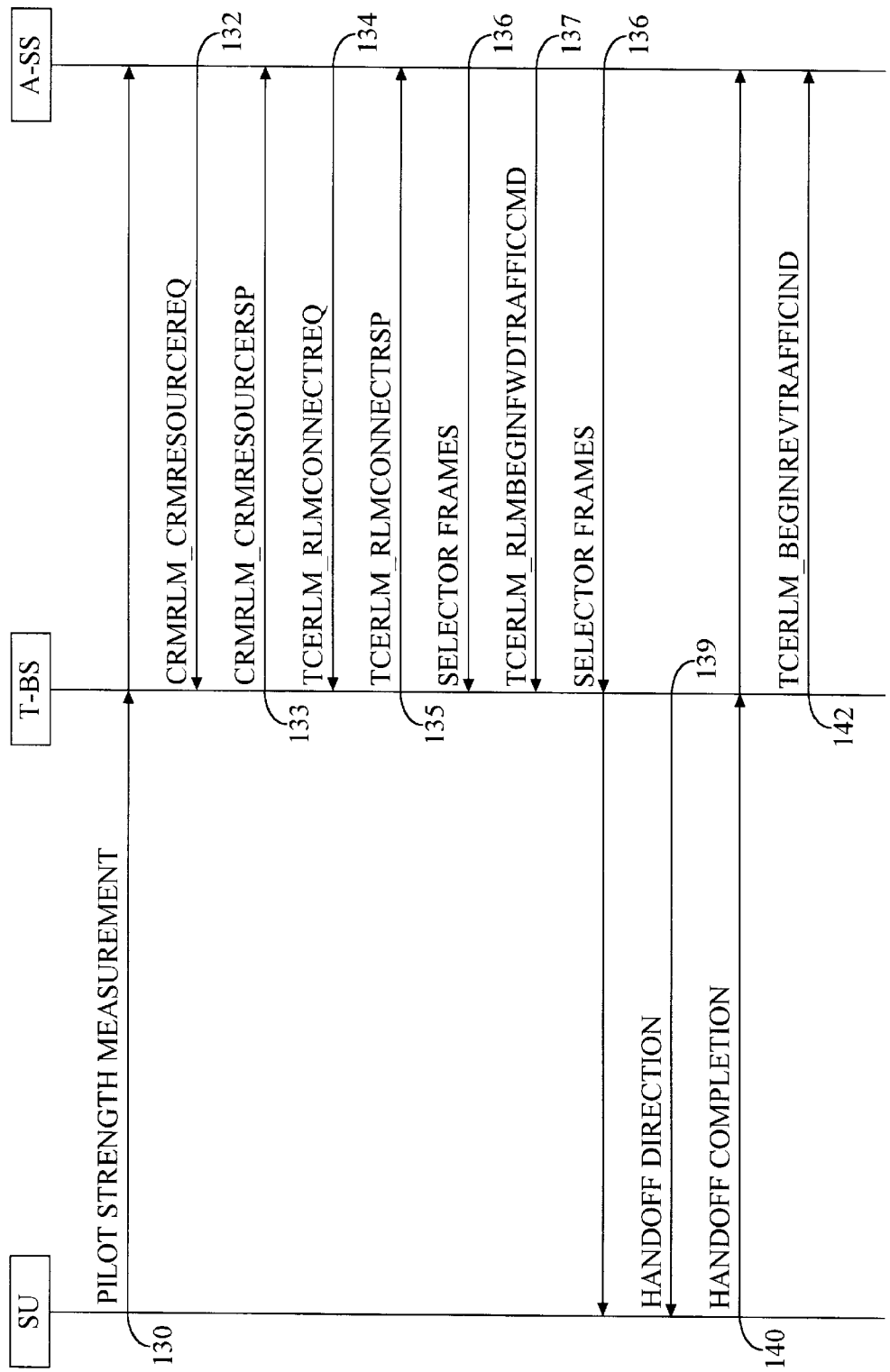
FIG. 7 is a message diagram illustrating the messages transmitted during an inter-system softer handoff setup procedure when performed in accordance with one embodiment of the invention.

FIG. 7 is a signal messaging diagram illustrating the signaling messages exchanged during a softer handoff setup performed within a base station 22 in a target CDMA cellular system. As noted above, a softer handoff is a handoff between sectors associated with the same base station 22. The softer handoff begins when subscriber unit 28 transmits Pilot Strength Measurement Report 130 to the selector resource processing the call within selection subsystem 40 indicating the pilot channel associated with a new sector is being received above a predetermined threshold and identifying the sector via a sector ID. The selector resource responds by transmitting CRMRLM_CRM Resource Request 132 to the base station 22. The base station 22 responds by transmitting CRMRLM_CRM Resource Response 133 which causes the selector resource to transmit TCERLM_RLM Connect Request 134. The base station 22 responds by transmitting TCERLM_RLM Connect Response 135 which cause the selector resource to transmit TCERLM_RLM Begin Forward Traffic Channel 137 while also transmitting forward link frames 136 to the base station 22. Upon receipt of TCERLM_RLM Begin Forward Traffic Channel 137 the base station 22 begins transmitting the forward link traffic channel in the new sector and transmits Handoff Direction 139 instructing the subscriber unit 28 to begin processing the forward link traffic channel in the new sector. Once subscriber unit 28 begins processing the forward link traffic channel from the new sector it transmits Handoff Completion 140 to selector resource. Additionally, the base station 22 begins to process the reverse link signal from subscriber unit 28 within the new sector and transmits TCERLM Begin Reverse Traffic Indicator 142 indicating the reverse traffic is now being processed using data received via the two sectors.

Figure 8:
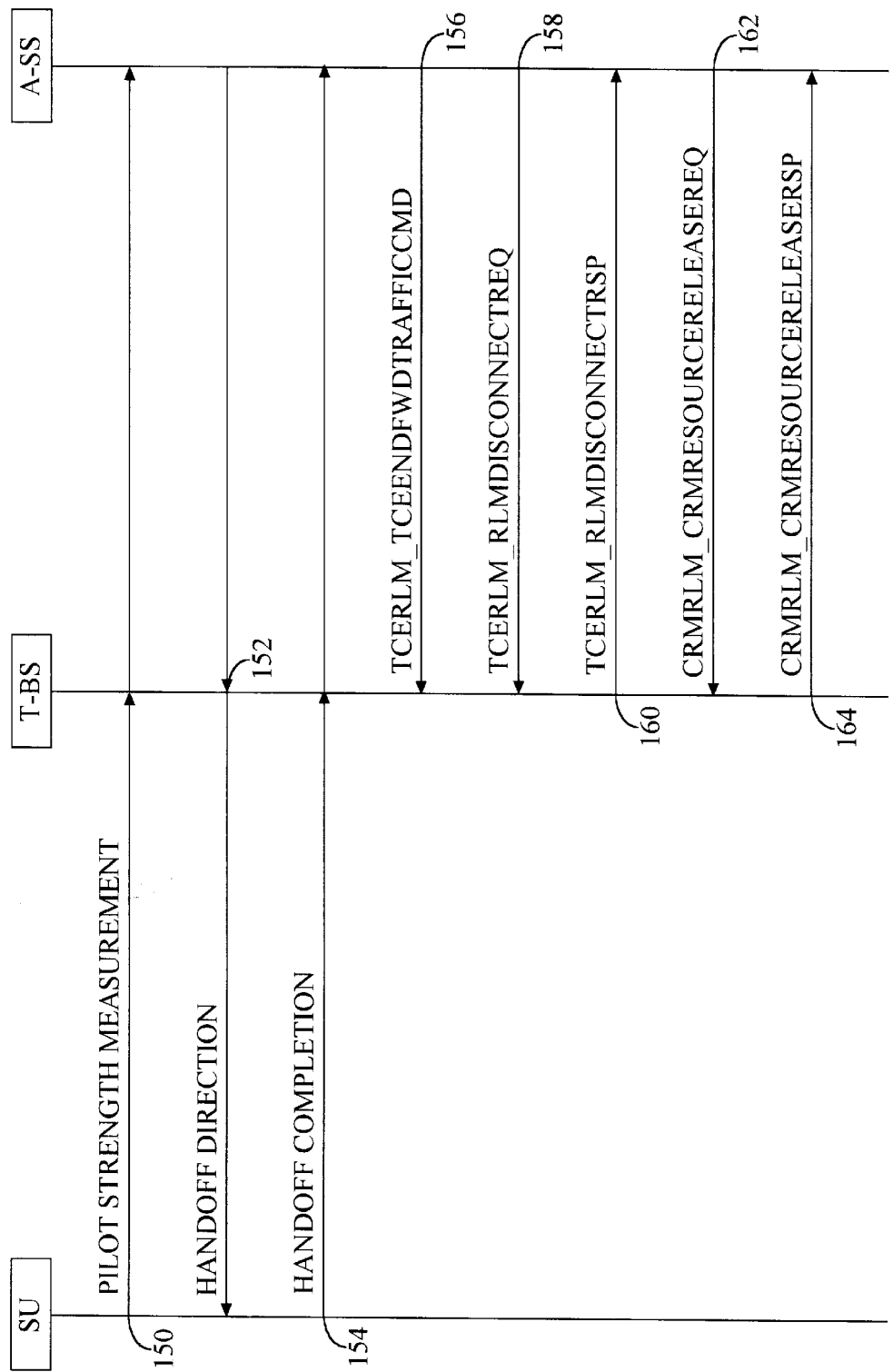
FIG. 8 is a message diagram illustrating the messages transmitted during an inter-system softer handoff teardown procedure when performed in accordance with one embodiment of the invention.

FIG. 8 is a signal messaging diagram illustrating the signaling messages exchanged during a softer handoff teardown of a intersystem call performed within a base station 22 in a target CDMA cellular system. The softer handoff teardown begins when subscriber unit 28 transmits Pilot Strength Measurement Report 150 to the selector resource processing the call within selection subsystem 40 indicating the pilot channel associated with a new sector is being received below a predetermined threshold. The selector resource responds by transmitting Handoff Direction 152 instructing subscriber unit 28 to begin soft handoff teardown. Once subscriber unit 28 terminates processing of the pilot channel from the sector, it transmits Handoff Completion 154 to the selector resource. The selector resource then responds by transmitting TCERLM_TCE End Forward Traffic Command 156 along with TCERLM_RLM Disconnect Request 158 to the base station 22. Base station 22 stops transmitting the forward traffic channel associated with the call from that sector and transmits TCERLM_RLM Disconnect Response 160 to the selector resource which then transmits CRMRLM_CRM Resource Release Request 162 instructing the base station 22 to release the resources previously allocated for processing the call. Upon receipt of CRMRLM_CRM Resource Release Request 164 the inter-system softer handoff teardown has been completed.

By providing inter-system soft handoff capability, the above described invention allows a CDMA subscriber unit 28 to cross CDMA cellular systems while maintaining at least one RF interface with a base station 22 at all times. This in turn allows CDMA cellular telephone service to be provided over given service area or region via the use of multiple CDMA cellular systems, which is useful because often large metropolitan areas require the use of multiple base station controller 20 to service the necessary number of base stations 22. Additionally, by first determining the number of inter-system calls being conducted between the anchor-CDMA cellular system and the target-CDMA cellular system at a particular frame offset, the above described invention allows multiple inter-system calls to be conducted via the use of a single T1 connection between two CDMA cellular system's in a orderly fashion, and in an efficient manner. Allowing inter-system calls and soft handoff to be conducted via a T1 connection in turn reduces the cost and complexity associated with providing inter-system soft handoff, while also increasing the likelihood that such a connection can be established because of the high prevalence and availability of such interconnections. Furthermore, by conducting an inter-system call and soft handoff via interconnections between BSC's 20, rather than by way of MSC's 26 or PSTN 19, the present invention uses the T1 or E1 interconnects more efficiently by allowing sharing of the interconnect resource by the multiple calls in inter-system soft handoff. Also, using packet based interconnects between BSC's 20 eliminates the need to convert the traffic data into and from PCM format, the process of which causes substantial degradation of the audio information ultimately produced.

Thus, a method and apparatus for performing an inter-system call that supports inter-system soft handoff has been described. The exemplary embodiment provided above is to enable any person skilled in the art to make or use the present invention. Various modifications consistent with the use of the invention will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for conducting an inter-system soft handoff of a call made by a subscriber unit between a first cellular system and a second cellular system comprising the steps of:

a) notifying the first cellular system that the subscriber unit is entering the second cellular system;

b) determining if sufficient network capacity exists in an interconnection between the first cellular system and the second cellular system to conduct the inter-system soft handoff including the substeps of:

b.1) querying said second cellular system via a query message;

b.2) receiving a second total number of inter-system calls from said second cellular system indicating a number of calls anchored at said second cellular system and having said first cellular system as a target cellular system;

b.3) summing said second total with a third total of inter-system calls anchored at said first cellular system and having said second cellular system as the target cellular system to yield a first total number of inter-system calls; and b.4) determining if sufficient network capacity exists between said first cellular system and said second cellular system based on a total capacity and said first total number of inter-system calls; and c) establishing a call channel between the first cellular system and the second cellular system if sufficient network capacity exists; and d) transmitting a first instance of forward link data received at said first cellular system to the subscriber unit by way of a first radio frequency signal interface between the subscriber unit and the first cellular system, and transmitting a second instance of forward link data to the subscriber unit by way of the second cellular telephone system and a second radio frequency interface between the subscriber unit and the second cellular system.

2. The method as set forth in claim 1 further comprising the step of receiving a first instance of reverse link data via said first radio frequency signal interface, and receiving a second instance of reverse link data by way of a second radio frequency interface and the second cellular system.

3. The method as set forth in claim 1 wherein step a) is comprised of the steps of:

transmitting a pilot strength measurement report from the subscriber unit to the first cellular system via said first radio frequency interface; and determining that a pilot channel from said second cellular system is being received above a predetermined level.

4. The method as set forth in claim 1 wherein step b.4) is comprised of the steps of:

comparing said first total number of inter-system calls to a first value if said first cellular system is operating at a first rate set; and comparing said first total number of inter-system calls to a second value if said first cellular system is operating at a second rate set.

5. A method for conducting an inter-system soft handoff of a call made by a subscriber unit between a first cellular system and a second cellular system comprising the steps of:

a) notifying the first cellular system that the subscriber unit is entering the second cellular system;

b) determining if sufficient network capacity exists in an interconnection between the first cellular system and the second cellular system to conduct the inter-system soft handoff including the substeps of:

b.1) obtaining a first total number of inter-system calls occurring between said first cellular system and said second cellular system, and a first set of subtotals of said first total corresponding to a set of frame offsets over which each inter-system call is being conducted; and b.2) determining if sufficient network capacity exists between said first cellular system and said second cellular system based on a total capacity and a frame offset capacity, and said first total number of inter-system soft handoffs and said first set of subtotals; and c) establishing a call channel between the first cellular system and the second cellular system if sufficient network capacity exists; and d) transmitting a first instance of forward link data received at said first cellular system to the subscriber unit by way of a first radio frequency signal interface between the subscriber unit and the first cellular system, and transmitting a second instance of forward link data to the subscriber unit by way of the second cellular telephone system and a second radio frequency interface between the subscriber unit and the second cellular system.

6. The method as set forth in claim 5 wherein step b.2) is comprised of the steps of:

determining if said total capacity is greater than said first total number of inter-system soft handoffs; and determining if a subtotal from said first set of subtotals corresponding to the frame offset of the call being processed is less than said frame offset capacity.

7. The method as set forth in claim 6 wherein said total capacity and said frame offset capacity depend on whether the first cellular system operates at a first rate set or a second rate set.

8. The method as set forth in claim 6 wherein said total capacity depends on how many T1 and E1 links are present between said first cellular system and said second cellular system.

9. The method as set forth in claim 6 wherein cellular system operates at Rate Set One, signaling overhead is approximately 5%, and said frame offset capacity is equal to:

10 if said interconnection is comprised of one T1 link;

23 if said interconnection is comprised of two T1 links;

42 if said interconnection is comprised of three T1 links;

62 if said interconnection is comprised of four T1 links;

77 if said interconnection is comprised of five T1 links; and 97 if said interconnection is comprised of six T1 links.

10. The method as set forth in claim 6 wherein cellular system operates at Rate Set One, signaling overhead is approximately 10%, and said frame offset capacity is equal to:

9 if said interconnection is comprised of one T1 link;

22 if said interconnection is comprised of two T1 links;

40 if said interconnection is comprised of three T1 links;

59 if said interconnection is comprised of four T1 links;

74 if said interconnection is comprised of five T1 links; and 92 if said interconnection is comprised of six T1 links.

11. The method as set forth in claim 6 wherein cellular system operates at Rate Set Two, signaling overhead is approximately 5%, and said frame offset capacity is equal to:

7 if said interconnection is comprised of one T1 link;

18 if said interconnection is comprised of two T1 links;

33 if said interconnection is comprised of three T1 links;

50 if said interconnection is comprised of four T1 links;

63 if said interconnection is comprised of five T1 links;

76 if said interconnection is comprised of six T1 links; and 88 if said interconnection is comprised of seven T1 links.

12. The method as set forth in claim 6 wherein cellular system operates at Rate Set Two, signaling overhead is approximately 10%, and said frame offset capacity is equal to:

6 if said interconnection is comprised of one T1 link;

17 if said interconnection is comprised of two T1 links;

32 if said interconnection is comprised of three T1 links;

48 if said interconnection is comprised of four T1 links;

60 if said interconnection is comprised of five T1 links;

72 if said interconnection is comprised of six T1 links; and 84 if said interconnection is comprised of seven T1 links.

13. The method as set forth in claim 6 wherein the cellular system operates at Rate Set One, signaling overhead is approximately 5%, and said frame offset capacity is equal to:

12 if said interconnection is comprised of one E1 link;

39 if said interconnection is comprised of two E1 links;

65 if said interconnection is comprised of three E1 links; and 90 if said interconnection is comprised of four E1 links.

14. The method as set forth in claim 6 wherein the cellular system operates at Rate Set One, signaling overhead is approximately 10%, and said frame offset capacity is equal to:

11 if said interconnection is comprised of one E1 link;

37 if said interconnection is comprised of two E1 links;

62 if said interconnection is comprised of three E1 links; and 86 if said interconnection is comprised of four E1 links.

15. The method as set forth in claim 6 wherein the cellular system operates at Rate Set Two, signaling overhead is approximately 5%, and said frame offset capacity is equal to:

8 if said interconnection is comprised of one E1 link;

22 if said interconnection is comprised of two E1 links;

48 if said interconnection is comprised of three E1 links;

70 if said interconnection is comprised of four E1 links; and 91 if said interconnection is comprised of five E1 links.

16. The method as set forth in claim 6 wherein the cellular system operates at Rate Set Two, signaling overhead is approximately 10%, and said frame offset capacity is equal to:

7 if said interconnection is comprised of one E1 link;

21 if said interconnection is comprised of two E1 links;

46 if said interconnection is comprised of three E1 links;

67 if said interconnection is comprised of four E1 links; and 87 if said interconnection is comprised of five E1 links.

17. A cellular telephone system for performing a soft handoff of a subscriber unit, comprising:

a first base station controller tracking a first total of inter-system calls anchored at said first base station controller; and a second base station controller for receiving forward link data to the subscriber unit, said first total of inter-system calls having said second base station controller as a target base station controller, said first base station controller also tracking a first set of subtotals of said first total corresponding to how many soft handoffs are being conducted using each frame offset, and said second base station controller tracking a second total of inter-system soft handoffs anchored at said second base station controller and having said first base station controller as a target base station controller, said second base station controller also tracking a second set of subtotals of said second total corresponding to how many of said inter-system soft handoffs are using each frame offset.

18. The cellular system as set forth in claim 17 wherein, said first base station controller queries said second base station controller for said second total and said second set of subtotals when notified that the subscriber unit is moving into a coverage area associated with said second base station controller, and said first base station controller determines whether a soft handoff should take place by summing said first total and said second total to yield a third total and comparing said third total to a predetermined maximum, and by summing a first subtotal associated with the present subtotals from said first set of frame offsets with a second subtotal associated with the present frame offset to yield a third subtotal and comparing said third subtotal with a second frame offset maximum.

19. A base station controller for soft handing off a telephone call from a first base station controlled by the base station controller to a second base station controlled by a second base station controller, said telephone call having an associated frame offset, comprising:

a call control processor for tracking a total number of inter-system soft handoffs anchored at said base station controller and a vector of total number of calls for each frame offset; and a selector subsystem for performing data-selection and call-handoff and for notifying said call control processor when the subscriber unit is entering a coverage area associated with the second base station, wherein said call control processor obtains a vector of total calls anchored at said second base station for each frame offset from said second base station controller and calculates a second total number of calls and a frame offset call total, and causes inter-system soft handoff to take place if said second total number of calls is less than a predetermined maximum, and said frame offset call total is less than a frame offset maximum.

20. The base station controller as set forth in claim 19 wherein said call control processor determines if the coverage area into which the subscriber unit is entering is associated with a base station controller to which a direct network connection exists.

21. The base station controller as set forth in claim 19 wherein said second total number of calls is calculated by summing said first total number of calls with said vector of total calls for each frame offset obtained by said call control processor.

22. The base station controller as set forth in claim 19 further comprising:

a cellular system gateway for interfacing the base station controller to said second base station controller using a packet based connection; and an interconnect subsystem for routing frames among said selector subsystem, said call control processor, and said cellular system gateway.

23. The base station controller as set forth in claim 22 wherein said packet based connection is formed using at least one T1 link.

24. The base station controller as set forth in claim 22 wherein said packet based connection is formed using at least one E1 link.

25. The base station controller as set forth in claim 22 wherein said selection subsystem includes a pilot database containing a list of base stations, associated pilot offsets, and associated network to which each base station in said list of base station belongs.

* * * * *